Feb. 2, 1937.   G. N. MUSICK   2,069,675
FILLING DEVICE
Filed Jan. 24, 1936   2 Sheets-Sheet 2
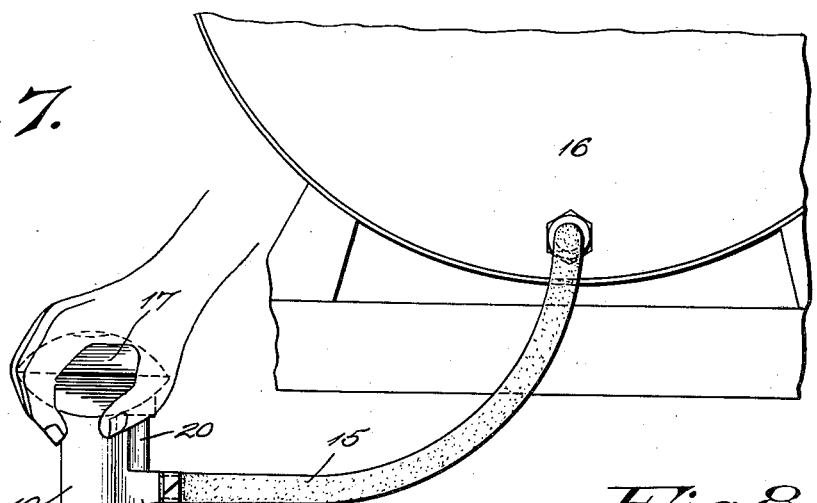
Fig. 7.
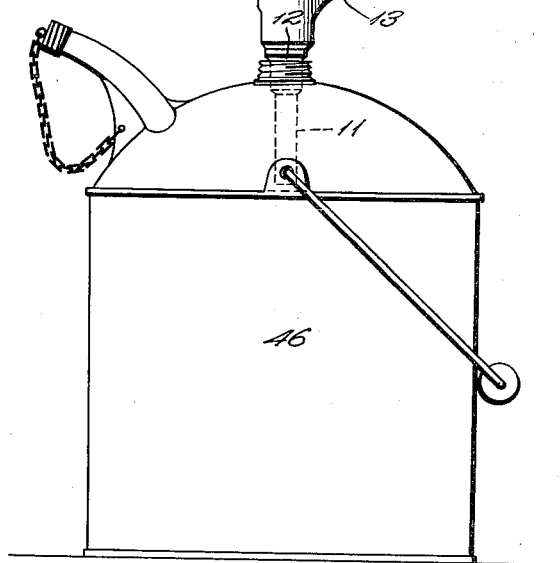
Fig. 8.
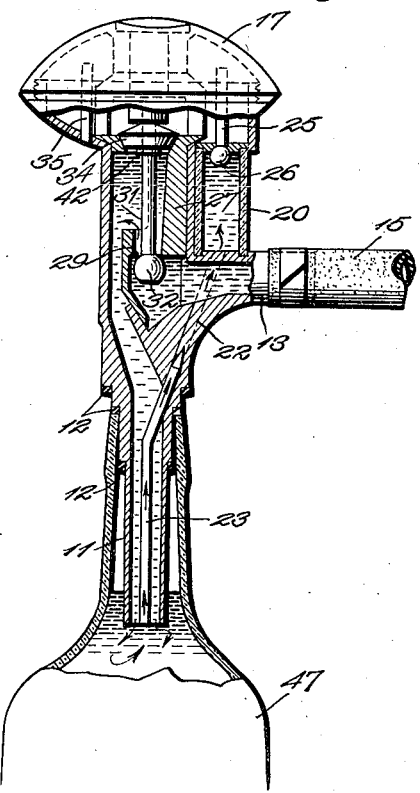
Fig. 9.
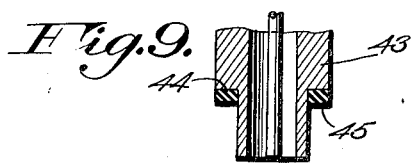
George N. Musick
INVENTOR
BY Victor J. Evans & Co.
ATTORNEY Patented Feb. 2, 1937

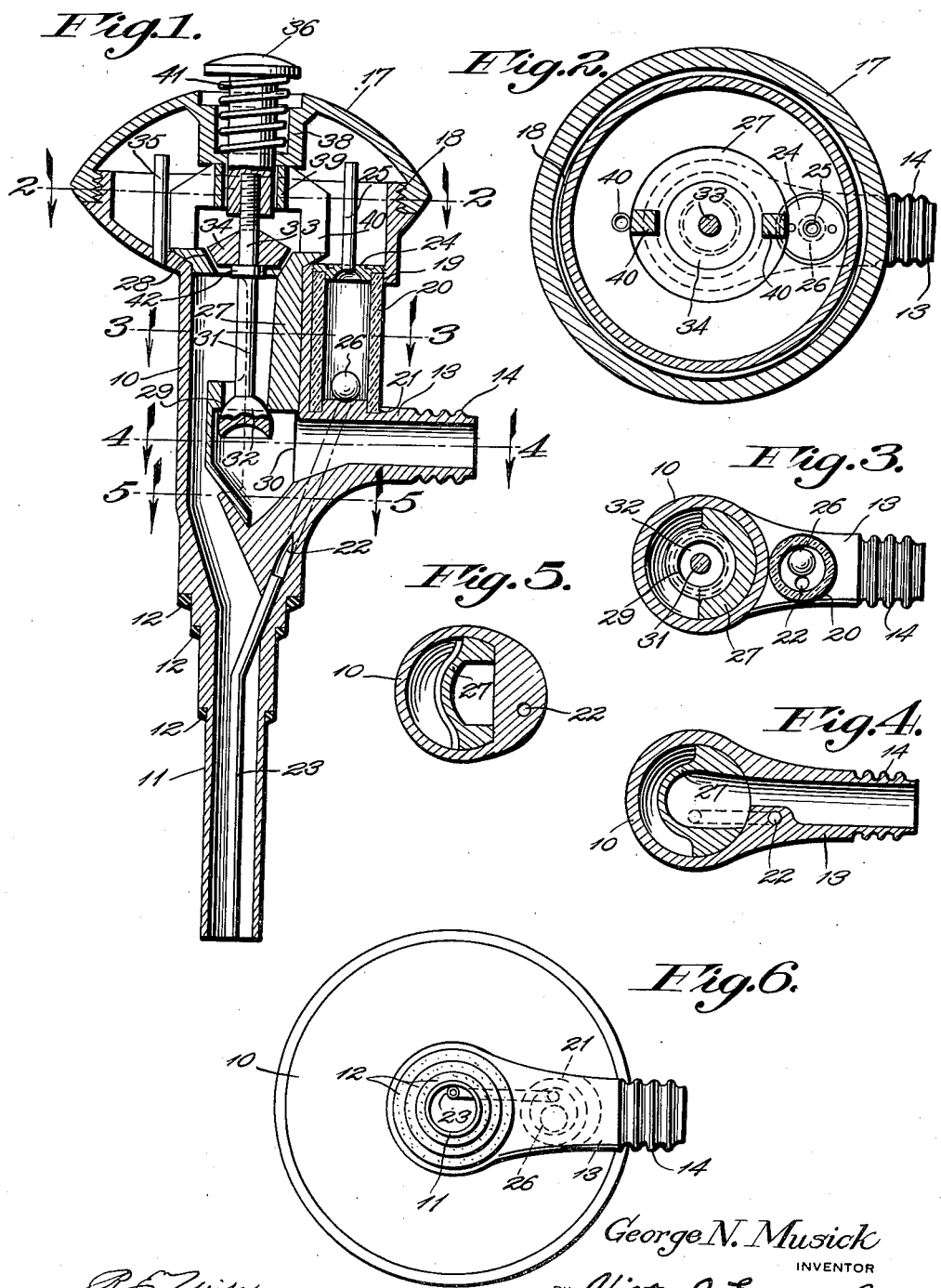

2,069,675

UNITED STATES PATENT OFFICE 2,069,675

FILLING DEVICE

George Newton Musick, Huntington, W. Va.

Application January 24, 1936, Serial No. 60,694

3 Claims. (Cl. 226—121)

This invention relates to filling devices and has for an object to provide a device of this character for filling containers and other devices such as storage batteries wherein a definite liquid level is desired.

A further object is to provide a device of this character having a visible indicator for indicating when the proper amount of liquid has been supplied and for automatically stopping the flow of liquid to prevent overflow.

A further object is to provide a ball grip and spring device thereon by means of which a downward rectilinear pressure may be easily and comfortably applied to control the valves of the device.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a longitudinal sectional view through a filling device constructed in accordance with the invention.

Figure 2 is a cross sectional view taken on the line 2—2 of Figure 1.

Figure 3 is a cross sectional view taken on the line 3—3 of Figure 1.

Figure 4 is a cross sectional view taken on the line 4—4 of Figure 1.

Figure 5 is a cross sectional view taken on the line 5—5 of Figure 1.

Figure 6 is a bottom plan view of the filling device.

Figure 7 is a side elevation of the filling device showing the same in operative position for filling a can from a container.

Figure 8 is a longitudinal sectional view with parts in elevation, and showing the float ball in position to prevent overflow of a bottle during filling thereof.

Figure 9 is a detail sectional view showing the form of nozzle used for filling storage batteries.

Referring now to the drawings in which like characters of reference designate similar parts in the various views, 10 designates the cylindrical barrel of the device, the same terminating at the bottom in a stepped nozzle 11 adapted to enter the mouth of the can, bottle, or other receptacle to be filled to a predetermined level. Rubber gaskets 12 are seated on the steps or shoulders of the nozzle to seal the opening in the rim of containers of various diameters. The barrel is provided with a laterally disposed pipe 13, which is exteriorly threaded, as shown at 14, to enter the end of a flexible hose 15 through which liquid is supplied from a container 16, as shown in Figure 7.

A ball grip 17 is mounted on the top of the barrel 10, preferably the grip being formed in two parts detachably connected together by screw threads 18. The lower section of the grip is formed integral with the barrel and is provided in the bottom laterally of the barrel with an opening 19 to receive a sight glass 20 which extends parallel with the barrel and is mounted at the lower end in a recess 21 formed in the pipe 13.

A duct 22 is formed obliquely in the barrel and enters the sight glass. A vent pipe 23 is secured at the upper end in the lower end of the duct and extends downwardly in the nozzle along one side of the nozzle to the extreme lower end of the nozzle.

The upper end of the sight glass is closed by a removable plug 24 and a vent pipe 25 is disposed axially in the plug and extends upwardly into the hollow ball grip 17. A ball float 26 is housed within the sight glass and normally seals the duct 22. When liquid rises through the vent pipe 23 and duct 22 into the sight glass the ball will float upwardly thereon and finally seal the vent pipe 25 in the grip to stop escape of air from the container which is being filled and automatically shut off flow through the barrel and nozzle.

A valve housing 27 is mounted in the barrel and is provided within the ball grip with a valve seat 28 and below this valve seat is formed with another valve seat 29, the valve housing below the lower valve seat 29 having a lateral opening 30 which communicates with the pipe 13.

A valve stem 31 is mounted axially in the bore of the barrel and at the bottom is equipped with a ball valve 32 which seats upwardly against the lower valve seat 29 to shut off communication between the pipe 13 and the bore of the barrel 10. The valve stem 31 is provided with an extension 33 which extends upwardly in the hollow ball grip and upon which is slidably fitted a valve 34. The valve is closed downwardly, as will presently be described, to seal the upper end of the bore of the barrel 10 when the lower valve 32 is open, thereby forming a continuous passage for the liquid from the pipe through the lower valve seat 29 upwardly, as shown by the arrow head in Figure 8, and then downwardly through the nozzle into the container to be filled.

The air is pushed out ahead of the mounting liquid level through the vent pipe and escapes into the hollow grip through the vent pipe 25 and from the interior of the grip escapes into the atmosphere through an upstanding vent pipe 35 which opens through the bottom section of the grip, as shown in Figure 1.

For operating the valves a push button 36 is provided with a stem 37 which is slidably mounted in an opening in the bottom of a cylindrical housing 38 which extends from the top section of the grip downwardly within the grip. The stem of the push button is provided with a threaded recess which receives the threaded upper end of the valve stem extension 33 so that the push button and the lower valve 32 move as a unit when the operator closes his hand upon the ball grip with the palm pressed against the push button. The stem of the push button is guided by means of a cylindrical guide 39 carried by legs 40 which are formed integral with the valve housing 27.

A helical spring 41 surrounds the stem of the push button and is confined under tension between the push button and the bottom of the housing 38 to return the push button to neutral position when the operator removes pressure of his hand from the push button.

As before stated, the upper valve 34 is slidably mounted on the extension 33 of the valve stem 31, and the upper valve normally is supported upon a collar 42 which is formed integral with the valve stem 31. When the valve 32 is in closed position, as shown in Figure 1, the collar 42 is located within the upper valve seat 28 and maintains the upper valve 34 open. However, when the push button is depressed the collar 42 recedes downwardly and permits the valve to close against the valve seat 28. During the final stages of downward movement of the valve stem 31 the push button stem engages the top of the upper valve 34 and presses the latter tightly in its seat 28 so that a liquid tight and air tight seal is provided for the upper end of the bore of the barrel 10.

The stepped nozzle 11 is fully effective for filling bottles, cans, and other containers. However, a wide use of the device will be for filling storage batteries with electrolyte to a predetermined level. To accommodate the device to this use, the nozzle 43, shown in Figure 9, is provided at the end with a step or shoulder 44 located a short distance above the extreme end of the nozzle. A rubber or other gasket 45 is seated on the shoulder and is adapted to seal the rim of the battery filling opening air tight when the end of the nozzle is inserted in the filling opening to a position slightly above the plates of the battery. The shoulder and gasket thus limit insertion of the nozzle in the battery so that the desired level of the electrolyte will be effected.

In operation the operator closes his hand upon the ball grip 17 and exerts rectilinear downward pressure with his hand so that the device is sealed air tight in the mouth of the container or other article to be filled and at the same time pressure is exerted by the palm of the hand against the push button to open the lower valve 32. As the liquid flows into the container the air is displaced and will escape through the vent pipe 23, sight glass 20, vent pipe 25, and vent pipe 35 into the atmosphere. When the liquid has risen to the lower end of the nozzle and covered the same, as shown in Figure 8, there is no escape for the remaining air so that the liquid will rise through the vent pipe 23 into the sight glass 20 and lift the ball float 26 to seal the bottom of the vent pipe 25. Closing of the vent pipe 25 immediately creates back pressure and this back pressure automatically cuts off flow of liquid from the flexible pipe 15 into the barrel 10 of the device. The operator may now lift the device from the container whereupon the spring 41 being relieved of pressure of the operator's hand, will immediately close the lower valve 32 and permit the upper valve 34 to be opened by the rising collar 42 so that atmospheric pressure will enter the barrel 10 of the device and force out the remaining liquid in the barrel to fill the container to the required level.

It will be observed that if the operator is attentive he will observe the float ball rising in the sight glass and can immediately withdraw the nozzle from the container because in practice it is found that the interval of time elapsing between the moment the ball starts to rise and the moment it actually seals the bottom of the vent pipe 25 is an almost inappreciable time lapse. However, even if he is not attentive no overflow can possibly take place since the ball 26, as above described, will eventually seal the vent pipe 25 and automatically cut off flow from the supply pipe 15 to the container such as for instance a can 46, as shown in Figure 7, or a bottle 47, as shown in Figure 8, or a storage battery.

It will be further pointed out that an additional function of the ball grip is to provide space to receive possible overflow of liquid from the sight glass 20 through the vent pipe 25 in the event the indicating ball 26 is slow in seating. Since both vent tubes 25 and 35 extend upwardly in the hollow ball grip, it will be seen that overflow through the vent pipe 25 before seating of the ball 26 will be retained in the hollow grip until the valve 32 is closed and the valve 34 opened.

From the above description it is thought that the construction and operation of the invention will be fully understood without further explanation.

What is claimed is:

1. A filling device comprising a nozzle, a barrel integral therewith having a lateral intake pipe, a valve housing in the barrel having superposed valve seats, a valve stem movable axially in the barrel, an intake valve integral with the stem seating in the lower valve seat, a valve loose on the stem seating in the upper valve seat, a hollow vented ball grip on the upper end of the barrel, a spring pressed push rod disposed axially in the grip and operatively connected to said stem, the stem projecting from the grip and adapted to be depressed by closing of the operator's hand upon the grip to open the intake valve and close the upper valve, and a float controlled vent conduit extending through the nozzle, through the barrel and into the hollow grip for automatically shutting off the flow through the intake valve at a predetermined point in the filling operation.

2. A filling device comprising a nozzle having an external shoulder for limiting insertion of the nozzle into a container to be filled, a gasket on the shoulder for sealing the nozzle air tight in the container, a barrel integral with the nozzle, a vented hollow ball grip on the upper end of the barrel communicating with the barrel, a valve seat in the grip at its juncture with the barrel, a valve seat in the barrel below the first named valve seat, valves seating in said seats, releasable means on the ball grip for opening the lower valve and closing the upper valve, release of said means closing the lower valve and opening the upper valve, and a float ball control air vent duct extending through the nozzle, through the barrel and into the ball grip for cutting off flow through the lower valve at a predetermined point in the filling operation.

3. A filling device comprising a nozzle, a barrel integral therewith, an intake valve in the barrel, a vent tube within the nozzle and barrel, a ball float normally sealing the tube, a hollow grip on the end of the barrel opposite the nozzle, upright vent pipes in the grip, one of the vent pipes in the grip being adapted to be sealed by the ball float when liquid elevates the ball float, a spring pressed push rod disposed axially in the ball grip and actuated by closing of the operator's hand upon the ball grip to open the intake valve, and a valve carried by the push rod and adapted to be opened to establish communication between the interior of the ball grip and the barrel when the push rod is moving in a direction to close the intake valve.

GEORGE NEWTON MUSICK.